(12) United States Patent
Choi et al.

(10) Patent No.: US 12,019,823 B2
(45) Date of Patent: Jun. 25, 2024

(54) DISPLAY APPARATUS

(71) Applicant: LG Display Co., Ltd., Seoul (KR)

(72) Inventors: NamSu Choi, Paju-si (KR); Eunmin Jo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/057,153

(22) Filed: Nov. 18, 2022

(65) Prior Publication Data

US 2023/0214049 A1     Jul. 6, 2023

(30) Foreign Application Priority Data

Dec. 31, 2021    (KR) ........................ 10-2021-0194596

(51) Int. Cl.
| | | |
|---|---|---|
| *G06F 3/041* | (2006.01) | |
| *G06F 3/042* | (2006.01) | |
| *G06F 3/044* | (2006.01) | |

(52) U.S. Cl.
CPC ........ *G06F 3/04164* (2019.05); *G06F 3/0412* (2013.01); *G06F 3/041662* (2019.05); *G06F 3/0421* (2013.01); *G06F 3/0445* (2019.05); *G06F 3/0446* (2019.05); *G06F 2203/04111* (2013.01); *G06F 2203/04112* (2013.01)

(58) Field of Classification Search
CPC ............... G06F 3/04164; G06F 3/0412; G06F 3/041662; G06F 3/0421; G06F 3/0445; G06F 3/0446; G06F 2203/04111; G06F 2203/04112; G06F 3/0443; G06F 2203/04102; G06F 3/044
See application file for complete search history.

(56) References Cited

U.S. PATENT DOCUMENTS

2018/0350890 A1\* 12/2018 Jeong .................... H10K 50/865
2019/0326361 A1\* 10/2019 Gwon .................. H10K 50/865

FOREIGN PATENT DOCUMENTS

KR          102302803 B1     9/2021

\* cited by examiner

*Primary Examiner* — Patrick N Edouard
*Assistant Examiner* — Joseph P Fox
(74) *Attorney, Agent, or Firm* — Seed IP Law Group LLP

(57) ABSTRACT

Provided is a display apparatus. The display apparatus comprises a display panel including a front portion including a display area and a non-display area, a bending portion, and a back portion bent from the bending portion and disposed rearward of the front portion; a plurality of touch routing lines disposed in the non-display area and electrically connected to a plurality of touch electrodes disposed in the display area; and a plurality of auxiliary lines disposed below the plurality of touch routing lines, in which the plurality of touch routing lines are discontinuously disposed on the bending portion while having a predetermined length.

7 Claims, 13 Drawing Sheets

DISPLAY APPARATUS

CROSS-REFERENCE TO RELATED APPLICATIONS

This application claims the priority of Korean Patent Application No. 10-2021-0194596 filed on Dec. 31, 2021, in the Korean Intellectual Property Office, the disclosure of which is incorporated herein by reference.

BACKGROUND

Technical Field

The present disclosure relates to a display apparatus.

Description of the Related Art

With the development of an information-oriented society, there is an increasing demand for display apparatus for displaying images. Various types of display apparatus such as a liquid crystal display apparatus and an organic light-emitting display apparatus are used as the display apparatus.

In order to provide more diverse features to a user, the display apparatus recognizes the user's touch on a display panel and performs the input processing based on the recognized touch.

For example, the touch-recognizable display apparatus may include a plurality of touch electrodes disposed on or embedded in the display panel and detect touch coordinates, whether the user's touch is made on the display panel, and the like by operating the touch electrodes.

Recently, there is an increasing demand for display panels with high touch performance. Therefore, the display apparatus adopts design for improving the efficiency of the touch electrode itself.

Further, the size of the display apparatus is a very important factor in designing the display apparatus. For example, there is an increasing need for a high ratio of a size of a display area to a size of a non-display area that is referred to as a ratio of a screen to a bezel. Therefore, various attempts have been made to implement a narrow bezel.

Several components for operating the display panel and the touch panel are disposed in the non-display area of the display apparatus, and a need for the narrow bezel is further increased.

BRIEF SUMMARY

The inventors recognized that a bending portion of the display panel is vulnerable to bending stress and penetration of chemical materials.

A display apparatus according to an embodiment of the present disclosure provides a structure resistant to bending stress and penetration of chemical materials that may be applied to touch signal lines of a bending portion of a display panel.

According to an aspect of the present disclosure, a display apparatus includes: a display panel including a front portion including a display area and a non-display area, a bending portion, and a back portion bent from the bending portion and disposed rearward of the front portion; a plurality of touch routing lines disposed in the non-display area and electrically connected to a plurality of touch electrodes disposed in the display area; and a plurality of auxiliary lines disposed below the plurality of touch routing lines, in which the plurality of touch routing lines are discontinuously disposed on the bending portion while having a predetermined length.

According to an aspect of the present disclosure, a display apparatus includes: a display panel including a front portion including a display area and a non-display area, a bending portion, and a back portion bent from the bending portion and disposed rearward of the front portion; a plurality of light-emitting elements disposed in the display area; a plurality of signal lines disposed in the non-display area positioned outside the display area; an encapsulation layer disposed on the light-emitting element and the signal line; a plurality of first touch electrodes disposed on the encapsulation layer in the display area and arranged in a first direction; a plurality of second touch electrodes disposed on the encapsulation layer in the display area and arranged in a second direction perpendicular to the first direction; a first touch electrode connection line configured to connect the plurality of first touch electrodes; a second touch electrode connection line disposed between the plurality of first touch electrodes and configured to connect the plurality of second touch electrodes; a plurality of touch routing lines disposed on the encapsulation layer in the non-display area and electrically connected to the plurality of first touch electrodes or the plurality of second touch electrodes; and a plurality of auxiliary lines disposed below the plurality of touch routing lines, in which the second touch electrode connection line and the plurality of auxiliary lines are formed by the same process and made of the same material.

According to the embodiments of the present disclosure, it is possible to reduce or block the influence of bending stress and penetration of chemical materials that may be applied to the touch signal lines on the bending portion of the display panel. Therefore, it is possible to provide the display apparatus resistant to physical/chemical deformation.

According to the embodiments of the present disclosure, the bending portion of the display panel has the robust structure, which makes it possible to implement a narrow bezel with reliability.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

Figure 1:
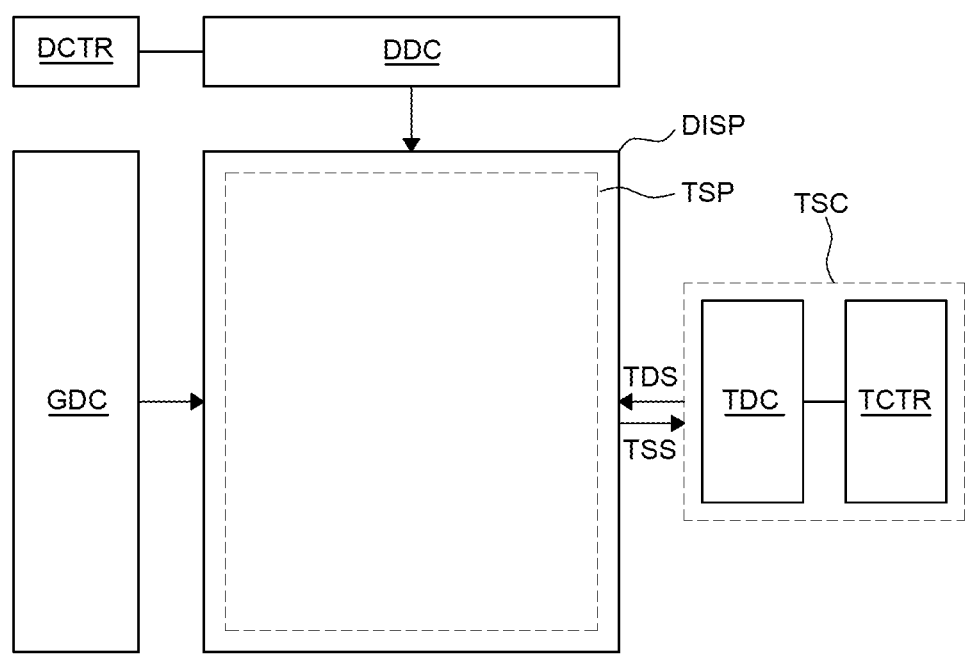
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Advantages and characteristics of the present disclosure and a method of achieving the advantages and characteristics will be clear with reference to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

In the present disclosure, the term "display apparatus" may mean a display apparatus in a narrow sense, such as a liquid crystal module (LCM), an organic light-emitting module (OLED Module), or a quantum dot module, that includes a display panel and a drive unit for operating the display panel. Further, the term "display apparatus" may also mean a set electronic apparatus or a set device (or set apparatus) such as a notebook computer, a television, a computer monitor, an automotive display apparatus, an equipment display apparatus including components for a vehicle, a mobile electronic apparatus such as a smartphone or electronic pad that are finished products (complete products or final products) including the LCM, the OLED module, the QD module, and the like.

Therefore, the display apparatus according to the present disclosure may mean the display apparatus itself, in a narrow sense, such as the LCM, the OLED module, or the QD module, the application product including the LCM, the OLED module, the QD module, and the like, or a set apparatus that is a final consumer device.

Further, in some instances, the LCM, the OLED module, or the QD module, which includes the display panel and the drive unit, may be expressed as the "display apparatus" in a narrow sense. Further, the electronic apparatus, which is the finished product including the LCM, the OLED module, or the QD module, may be expressed as the "set apparatus" that is distinguished from the display apparatus. For example, the display apparatus in a narrow sense includes the display panel, which is a liquid crystal (LCD) display apparatus, an organic light-emitting (OLED) display apparatus, or a quantum dot display apparatus, and a source PCB that is a control unit for operating the display panel. The set apparatus may include a set PCB that is a set control unit electrically connected to the source PCB and configured to control the entire set apparatus.

All types of display panels such as a liquid crystal display panel, an organic light-emitting diode (OLED) display panel, a quantum dot (QD) display panel, and an electroluminescent display panel may be used as the display panel used in the present embodiment. The present embodiment is not limited to a particular display panel in which a bezel may be bent by a flexible substrate for an organic light-emitting (OLED) display panel and a lower backplate support structure. Further, the shapes or sizes of the display panels used for the display apparatus according to the embodiment of the present disclosure are not limited.

For example, in a case in which the display panel is an organic light-emitting (OLED) display panel, the display panel may include a plurality of gate lines, a plurality of data lines, and a plurality of pixels formed in regions in which the gate lines and the data lines intersect one another. Further, the display panel may include: an array including thin-film transistors that are elements for selectively applying voltages to the respective pixels; and a sealing substrate or sealing layer (encapsulation) disposed on the array to cover an organic light-emitting element (OLED) layer disposed on the array. The sealing layer may protect the thin-film transistor and the organic light-emitting element layer from external impact and inhibit moisture or oxygen from penetrating into the organic light-emitting element layer. Further, the layer formed on the array may include an inorganic light-emitting layer, for example, a nano-sized material layer or a quantum dot layer.

Hereinafter, various configurations of the display apparatus will be described in detail, which may implement a narrow bezel having reliability and resistant to physical/chemical deformation by reducing or blocking an influence caused by bending stress and penetration of chemical materials that may be applied to the touch signal lines of the bending portion of the display panel.

FIG. 1 illustrates a display apparatus according to an embodiment of the present disclosure.

With reference to FIG. 1, the display apparatus according to an embodiment of the present disclosure may provide both a function of displaying images and a function of sensing touch.

To provide the image display function, the display apparatus according to the embodiment of the present disclosure may include: a display panel DISP on which a plurality of data lines and a plurality of gate lines are disposed and a plurality of sub-pixels defined by the plurality of data lines and the plurality of gate lines is arranged; a data drive circuit DDC configured to operate the plurality of data lines; a gate drive circuit GDC configured to operate the plurality of gate lines; and a display controller DCTR configured to control an operation of the data drive circuit DDC and an operation of the gate drive circuit GDC.

The data drive circuit DDC, the gate drive circuit GDC, and the display controller DCTR may be implemented as one or more separate component. In some instances, two or more components, among the data drive circuit DDC, the gate drive circuit GDC, and the display controller DCTR, may be integrated into a single component. For example, the data drive circuit DDC and the display controller DCTR may be implemented as a single integrated circuit chip (IC Chip).

To provide the touch sensing function, the display apparatus according to an embodiment of the present disclosure may include: a touch panel TSP including a plurality of touch electrodes; and a touch sensing circuit TSC configured to supply a touch driving signal TDS to the touch panel TSP, detect a touch sensing signal TSS from the touch panel TSP, and sense a touch position (touch coordinate) or whether a user's touch is made on the touch panel TSP on the basis of the detected touch sensing signal TSS.

For example, the touch sensing circuit TSC may include: a touch drive circuit TDC configured to supply the touch driving signal TDS to the touch panel TSP and detect the touch sensing signal TSS from the touch panel TSP; and a touch controller TCTR configured to sense a touch position and/or whether the user's touch is made on the touch panel TSP on the basis of the touch sensing signal TSS detected by the touch drive circuit TDC.

The touch drive circuit TDC may include a first circuit part configured to supply the touch driving signal TDS to the touch panel TSP, and a second circuit part configured to detect the touch sensing signal TSS from the touch panel TSP.

The touch drive circuit TDC and the touch controller TCTR may be implemented as separate components or integrated into a single component in some instances.

The data drive circuit DDC, the gate drive circuit GDC, and the touch drive circuit TDC may each be implemented as one or more integrated circuits. The data drive circuit DDC, the gate drive circuit GDC, and the touch drive circuit TDC may be implemented as a chip-on-glass (COG) type, a chip-on-film (COF) type, or a tape carrier package (TCP) type in a standpoint related to the electrical connection with the display panel DISP. The gate drive circuit GDC may also be implemented as a gate-in-panel (GIP) type.

The circuit components DDC, GDC, and DCTR for the display operation and the circuit components TDC and TCTR for the touch sensing may be implemented as one or more separate components. In some instances, one or more components, among the circuit components DDC, GDC, and DCTR for the display operation, and one or more components, among the circuit components TDC and TCTR for the touch sensing, may be integrated functionally and implemented as one or more components.

For example, the data drive circuit DDC and the touch drive circuit TDC may be integrated into one integrated circuit chip or two or more integrated circuit chips. In the case in which the data drive circuit DDC and the touch drive circuit TDC are integrated into the two or more integrated circuit chips, the two or more integrated circuit chips may each have a data operating function and a touch operating function.

The display apparatus according to the embodiment of the present disclosure may be an organic light-emitting display apparatus or a liquid crystal display apparatus. For example, various types of display panels DISP such as an organic light-emitting display panel or a liquid crystal display panel may be used. Hereinafter, an example will be described in which the display panel DISP is an organic light-emitting display panel.

As described below, the touch panel TSP may include: a plurality of touch electrodes to which the touch driving signal TDS may be applied or from which the touch sensing signal TSS may be detected; and a plurality of touch routing lines configured to connect the plurality of touch electrodes to the touch drive circuit TDC.

The touch panel TSP may be disposed outside the display panel DISP. For example, the touch panel TSP and the display panel DISP may be separately manufactured and then coupled or connected. The touch panel TSP may be called an externally-carried type or an add-on type, but the touch panel TSP is not limited to these terms.

In an example, the touch panel TSP may be embedded in the display panel DISP. For example, at the time of manufacturing the display panel DISP, the touch sensor structure including the plurality of touch electrodes and the plurality of touch routing lines, which constitute the touch panel TSP, may be formed together with the signal lines and electrodes for the display operation. The touch panel TSP may be called an embedded type, but the touch panel TSP is not limited to this term. For the convenience of description, an example will be described below in which the touch panel TSP is the embedded type.

Figure 2:
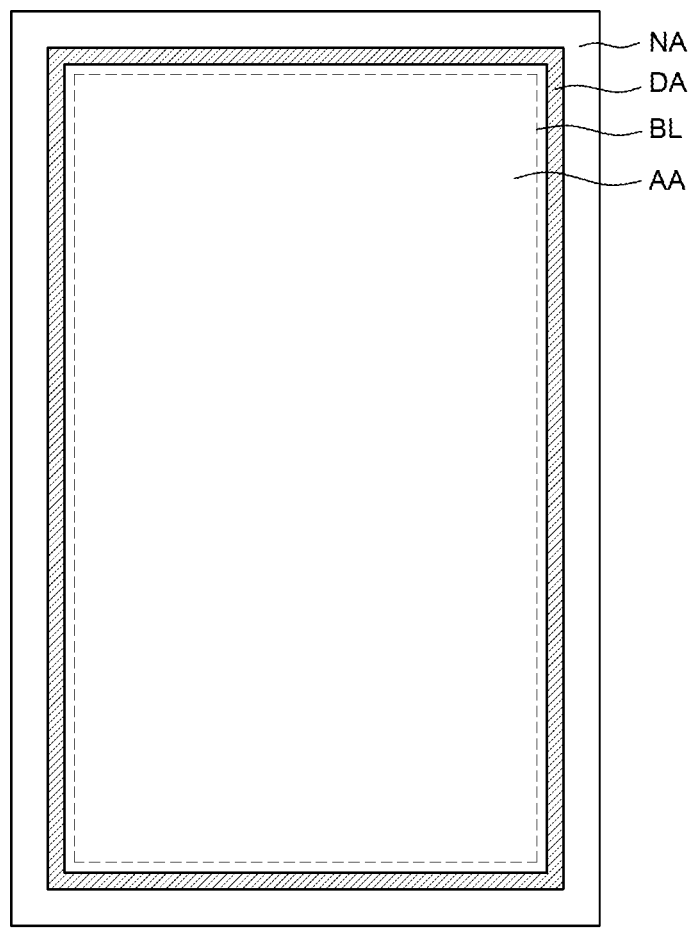
FIG. 2 illustrates a display panel of the display apparatus according to an embodiment of the present disclosure.

FIG. 2 illustrates a display panel of the display apparatus according to an embodiment of the present disclosure.

With reference to FIG. 2, the display panel DISP may include: an active area (or display area) AA in which images are displayed; and a non-active area (or non-display area) NA which is an outer peripheral region of a boundary line BL of an outer periphery of the active area AA. The active area AA may be a display area or a screen area, and the non-active area NA may be a non-display area or a bezel area, but the present disclosure is not limited to the terms.

The plurality of sub-pixels for the image display is arranged in the active area (or display area) AA of the display panel DISP. Various types of electrodes or signal lines for the display operation are disposed in the active area.

The plurality of touch electrodes for the touch sensing and the plurality of touch routing lines electrically connected to the plurality of touch electrodes may be disposed in the active area AA of the display panel DISP. Therefore, the active area AA may be called a touch sensing area that enables the touch sensing.

Link lines extending from various types of signal lines disposed in the active area AA may be disposed in the non-active area NA of the display panel DISP. Alternatively, link lines, which are electrically connected to various types of signal lines disposed in the active area AA, and pads, which are electrically connected to the link lines, may be disposed in the non-active area NA of the display panel DISP. The pads disposed in the non-active area NA may be bonded (or attached) or electrically connected to the display drive circuits (DDC, GDC, and the like).

The link lines extending from the plurality of touch routing lines disposed in the active area AA or the link lines electrically connected to the plurality of touch routing lines disposed in the active area AA and the pads electrically connected to the link lines may be disposed in the non-active area NA of the display panel DISP. The pads disposed in the non-active area NA may be bonded (or attached) or electrically connected to the touch drive circuit TDC.

A portion expanded from a part of an outermost peripheral touch electrode, among the plurality of touch electrodes disposed in the active area AA, may be present in the non-active area NA. One or more electrodes (touch electrodes) made of the same material of the plurality of touch electrodes disposed in the active area AA may be disposed in the non-active area NA.

For example, all the plurality of touch electrodes disposed in the display panel DISP may be present in the active area AA. Alternatively, some (e.g., the outermost peripheral touch electrodes) of the plurality of touch electrodes disposed in the display panel DISP may be disposed in the non-active area NA. Alternatively, some (e.g., the outermost peripheral touch electrodes) of the plurality of touch electrodes disposed in the display panel DISP may be disposed over the active area AA and the non-active area NA.

With reference to FIG. 2, the display panel DISP of the display apparatus according to the embodiment of the present disclosure may include a dam area DA in which a dam is disposed to inhibit any layer (e.g., an encapsulation layer on the organic light-emitting display panel) in the active area AA from being collapsed.

The dam area DA may be positioned at a boundary point between the active area AA and the non-active area NA or at any one point in the non-active area NA that is the outer peripheral region of the active area AA.

The dam disposed in the dam area DA may be disposed while surrounding the active area AA in all directions. Alternatively, the dam may be disposed only at an outer peripheral portion of one or two or more parts (e.g., a portion where a layer, which is easily collapsed, is present) of the active area AA.

The dam disposed in the dam area DA may have a single pattern continuously connected or disconnected two or more patterns. In addition, only a first dam may be disposed in the dam area DA. Two dams (e.g., first and second dams) may be disposed in the dam area DA. Three or more dams may be disposed in the dam area DA. The contents of the present disclosure are not limited by the number of dams.

Only the first dam may be disposed in any one direction in the dam area DA. Alternatively, both the first and second dams may be disposed in another direction.

Figure 3:
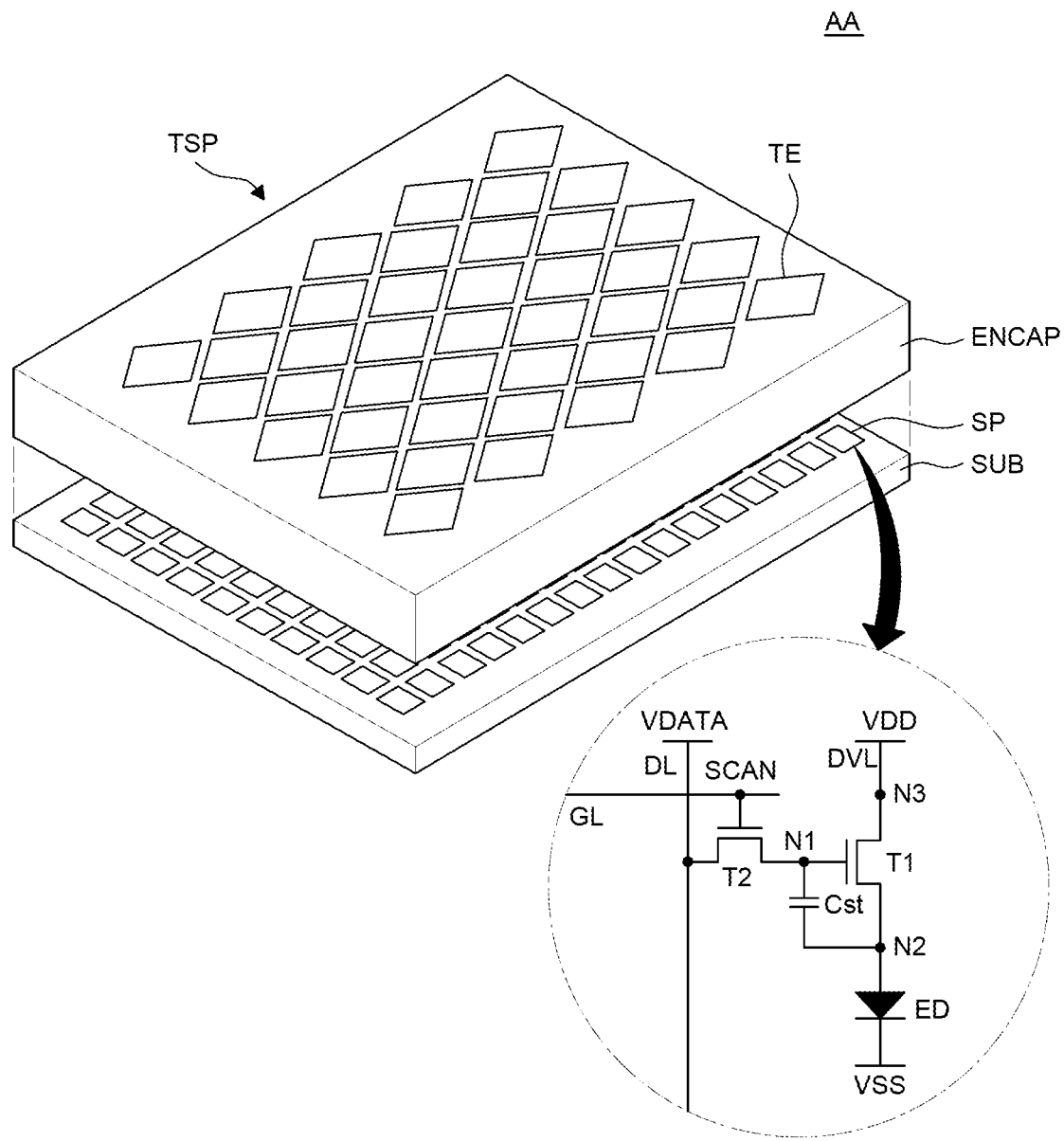
FIG. 3 illustrates a structure in which a touch panel is embedded in the display panel according to an embodiment of the present disclosure.

FIG. 3 illustrates a structure in which a touch panel is embedded in the display panel according to an embodiment of the present disclosure.

With reference to FIG. 3, a plurality of sub-pixels SP is arranged on a substrate SUB in the active area AA of the display panel DISP.

The sub-pixels SP may each include a light-emitting element ED, a first transistor T1 configured to operate the light-emitting element ED, a second transistor T2 configured to transmit data voltage VDATA to a first node N1 of the first transistor T1, and a storage capacitor Cst configured to maintain a predetermined voltage for one frame.

The first transistor T1 may include the first node N1 to which the data voltage VDATA may be applied, a second node N2 electrically connected to the light-emitting element ED, and a third node N3 to which a drive voltage VDD is applied from a drive voltage line DVL. The first node N1 may be a gate node, the second node N2 may be a source node or drain node, and the third node N3 may be a drain node or source node. However, the present disclosure is not limited to the term. The first transistor T1 may be a driving transistor for operating the light-emitting element ED. However, the present disclosure is not limited to the term.

The light-emitting element ED may include a first electrode (e.g., an anode electrode), a light-emitting layer, and a second electrode (e.g., a cathode electrode). The first electrode may be electrically connected to the second node N2 of the first transistor T1, and a base voltage VSS may be applied to the second electrode.

The light-emitting layer of the light-emitting element ED may be an organic light-emitting layer made of an organic material. For example, the light-emitting element ED may be an organic light-emitting diode (OLED).

The ON/OFF process of the second transistor T2 is controlled by a scan signal SCAN applied through a gate line GL. The gate line GL may be electrically connected between the first node N1 of the first transistor T1 and a data line DL. The second transistor T2 may be a switching transistor, but the present disclosure is not limited to the term.

When the second transistor T2 is turned on by the scan signal SCAN, the second transistor T2 transmits the data voltage VDATA, which is supplied from the data line DL, to the first node N1 of the first transistor T1.

The storage capacitor Cst may be electrically connected between the first node N1 and the second node N2 of the first transistor T1.

As illustrated in FIG. 3, the sub-pixels SP may each have a 2T1C structure including two transistors T1 and T2 and a single capacitor Cst. However, the present disclosure is not limited thereto. For example, the sub-pixels SP may each further include one or more transistors or further include one or more capacitors.

The storage capacitor Cst is not a parasitic capacitor (e.g., Cgs, Cgd) that is an internal capacitor that may be present between the first node N1 and the second node N2 of the first transistor T1. However, the storage capacitor Cst may be an external capacitor additionally designed outside the first transistor T1.

The first transistor T1 and the second transistor T2 may each be an n-type transistor or a p-type transistor.

As described above, the circuit elements such as the light-emitting element ED, the two or more transistors T1 and T2, and the one or more capacitors Cst are disposed on the display panel DISP. The circuit element (e.g., the light-emitting element ED) is vulnerable to outside moisture or oxygen. Therefore, an encapsulation layer ENCAP may be disposed on the display panel DISP in order to inhibit outside moisture or oxygen from penetrating into the circuit element (in particular, the light-emitting element ED).

The encapsulation layer ENCAP may be configured as a single or a plurality of layers. However, the present disclosure is not limited thereto.

In the display apparatus according to the embodiment of the present disclosure, the touch panel TSP may be formed on the encapsulation layer ENCAP.

For example, in the display apparatus, the touch sensor structure including the plurality of touch electrodes TE constituting the touch panel TSP may be disposed on the encapsulation layer ENCAP.

The touch driving signal TDS or the touch sensing signal TSS may be applied to the touch electrode TE during the touch sensing. Therefore, unnecessary parasitic capacitance may occur because a potential difference occurs between the touch electrode TE and the cathode electrode disposed with the encapsulation layer ENCAP interposed therebetween during the touch sensing. The parasitic capacitance may degrade the touch sensitivity. Therefore, to reduce the parasitic capacitance, a distance between the touch electrode TE and the cathode electrode may have a predetermined value (e.g., 1 μm) or more in consideration of a panel thickness, a panel manufacturing process, display performance, and the like. However, the present disclosure is not limited thereto. For example, a thickness of the encapsulation layer ENCAP may be at least 1 μm or more. However, the present disclosure is not limited thereto.

Figure 4:
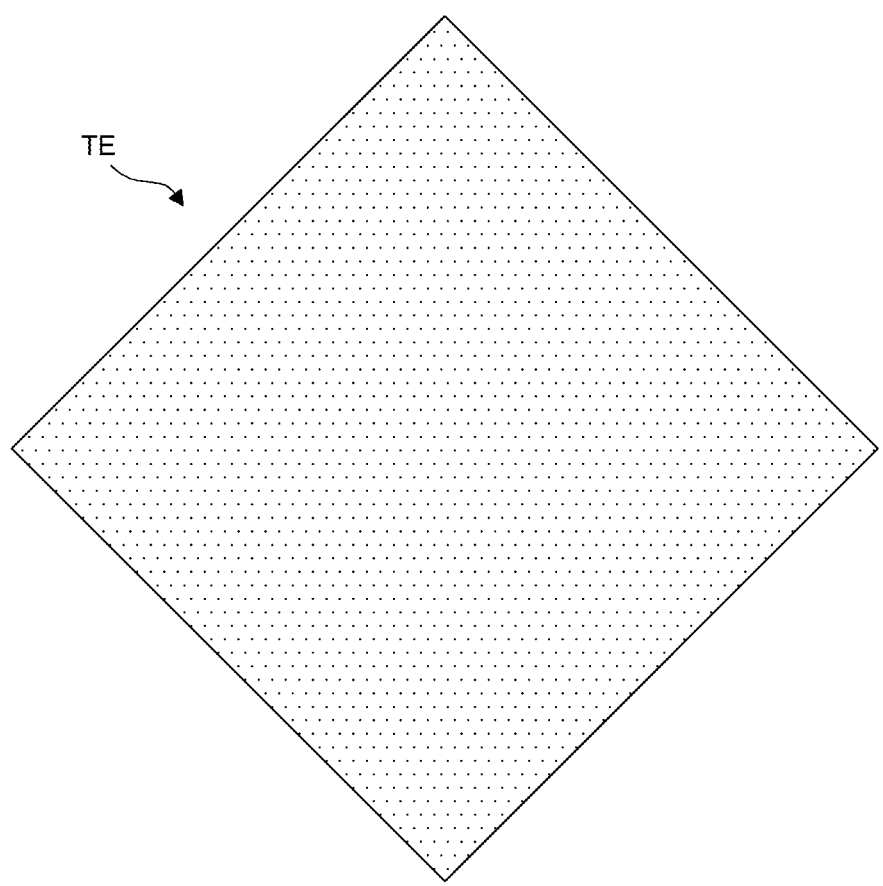
FIG. 4 illustrates a touch electrode disposed on the display panel according to an embodiment of the present disclosure.
Figure 5:
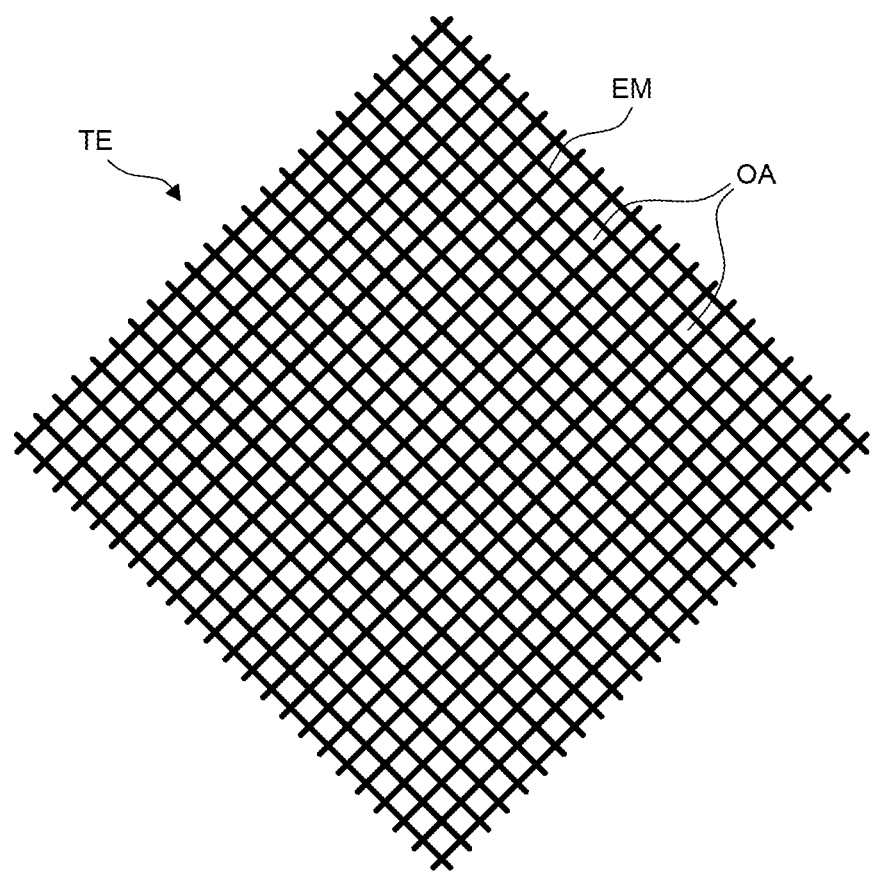
FIG. 5 illustrates a touch electrode disposed on the display panel according to an embodiment of the present disclosure.

FIGS. 4 and 5 illustrate a touch electrode disposed on the display panel according to an embodiment of the present disclosure.

As illustrated in FIG. 4, each of the touch electrodes TE disposed on the display panel DISP may be an electrode metal having a plate shape having no opening portion. In this case, each of the touch electrodes TE may be a transparent electrode. For example, each of the touch electrodes TE may be made of a transparent electrode material so that light beams emitted from the plurality of sub-pixels SP disposed below the touch electrodes TE may propagate upward while passing through the touch electrodes TE.

In an embodiment, as illustrated in FIG. 5, each of the touch electrodes TE disposed on the display panel DISP may be an electrode metal EM having two or more opening portions OA by being patterned in a mesh shape.

The electrode metal EM may be a portion substantially corresponding to the touch electrode TE. The electrode metal EM may be a portion to which the touch driving signal TDS is applied or in which the touch sensing signal TSS is detected.

As illustrated in FIG. 5, in the case in which each of the touch electrodes TE is an electrode metal EM patterned in a mesh shape, two or more opening portions OA may be present in the region of the touch electrode TE.

The two or more opening portions OA present in each of the touch electrodes TE may correspond to the light-emitting areas of the one or more sub-pixels SP. For example, the plurality of opening portions OA may be paths along which the light beams emitted from the plurality of sub-pixels SP disposed below the plurality of opening portions OA propagate upward. An example will be described below in which each of the touch electrodes TE is the mesh-type electrode metal EM.

The electrode metal EM corresponding to each of the touch electrodes TE may be positioned on the bank disposed in a region that is not the light-emitting areas of the two or more sub-pixels SP.

The method of forming several touch electrodes TE may form the several touch electrodes TE by widely forming the electrode metal EM in a mesh shape, cutting the electrode metal EM in a predetermined pattern, and electrically separating the electrode metals EM.

As illustrated in FIGS. 4 and 5, an outer peripheral shape of the touch electrode TE may be a quadrangular shape such as a diamond or rhombic shape or various shapes such as a triangular, pentagonal, or hexagonal shape. However, the present disclosure is not limited thereto.

Figure 6:
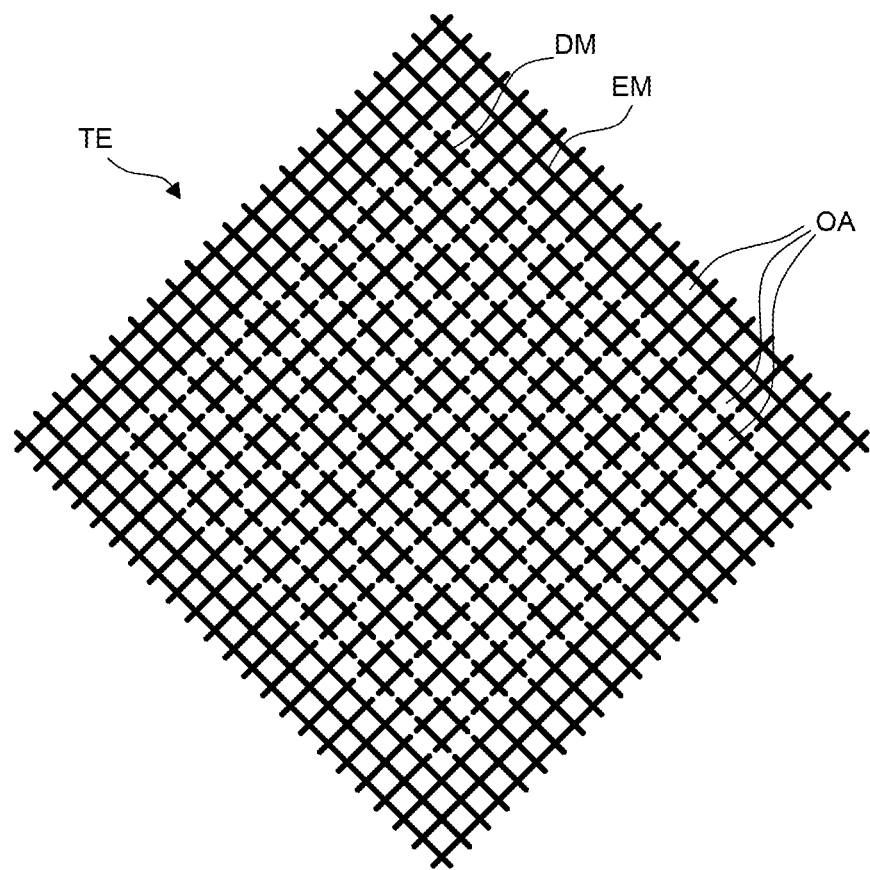
FIG. 6 illustrates a mesh-type touch electrode in FIG. 5.

FIG. 6 illustrates a mesh-type touch electrode in FIG. 5.

With reference to FIG. 6, one or more dummy metals DM is disposed in the region of each of the touch electrodes TE and disconnected from the mesh-type electrode metal EM.

The electrode metal EM may be a portion substantially corresponding to the touch electrode TE. The electrode metal EM may be a portion to which the touch driving signal TDS is applied or in which the touch sensing signal TSS is detected. The dummy metal DM may be a portion disposed in the region of the touch electrode TE. However, the dummy metal DM may be a portion to which no touch driving signal TDS is applied and in which no touch sensing signal TSS is detected. For example, the dummy metal DM may be an electrically floating metal. Therefore, the electrode metal EM may be electrically connected to the touch drive circuit TDC. However, the dummy metal DM may not be electrically connected to the touch drive circuit TDC.

In the entire regions of all the touch electrodes TE, one or more dummy metals DM may be disposed in a state in which the dummy metals DM are disconnected from the electrode metal EM or the dummy metals DM are not connected to the electrode metal EM.

In an embodiment, only in the regions of some of the touch electrodes TE, among the all the touch electrodes TE, one or more dummy metals DM may be disposed in a state in which the dummy metals DM are disconnected from the electrode metal EM or the dummy metals DM are not connected to the electrode metal EM. For example, no dummy metal DM may be disposed in the regions of the some of the touch electrodes TE.

As illustrated in FIG. 5, regarding the function of the dummy metal DM, there may occur a problem in that a contour of the electrode metal EM is visible on a screen when only the electrode metal EM is provided in a mesh shape without one or more dummy metals DM in the region of the touch electrode TE.

In contrast, as illustrated in FIG. 6, when the one or more dummy metals DM are present in the region of the touch electrode TE, it is possible to solve the problem in that the contour of the electrode metal EM is visible on the screen.

The touch sensitivity may be improved by adjusting a magnitude of capacitance for each of the touch electrodes TE by adjusting the presence or absence of the dummy metal DM or the number of dummy metals DM (a ratio of the dummy metal) for each of the touch electrodes TE.

The cut electrode metal EM may be formed as the dummy metal DM by cutting some points of the electrode metal EM formed in the region of the single touch electrode TE. For example, the electrode metal EM and the dummy metal DM may be formed on the same layer and made of the same material.

The display apparatus according to the embodiment of the present disclosure may sense the touch on the basis of capacitance occurring on the touch electrode TE.

The display apparatus according to the embodiment of the present disclosure may sense the touch by using a touch sensing method based on mutual-capacitance, as a touch sensing method based on capacitance. Alternatively, the display apparatus may sense the touch by using a touch sensing method based on self-capacitance. However, the present disclosure is not limited thereto.

In the case of the touch sensing method based on mutual-capacitance, the plurality of touch electrodes TE may include a drive touch electrode (transmitting/receiving touch electrode) to which the touch driving signal TDS is applied, and a sensing touch electrode (receiving touch electrode) configured to detect the touch sensing signal TSS and form capacitance together with the drive touch electrode.

In the case of the touch sensing method based on the mutual-capacitance, the touch sensing circuit TSC senses the touch coordinate and/or whether the touch is made on the basis of a change in capacitance (mutual-capacitance) between the drive touch electrode and the sensing touch electrode in accordance with the presence or absence of a pointer such as a finger or a pen.

In the case of the touch sensing method based on self-capacitance, each of the touch electrodes TE may serve as both the drive touch electrode and the sensing touch electrode. For example, the touch sensing circuit TSC applies the touch driving signal TDS to the one or more touch electrodes TE and detects the touch sensing signal TSS through the touch electrode TE to which the touch driving signal TDS is applied. Further, based on the detected touch sensing signal TSS, the touch sensing circuit TSC senses the touch coordinate and/or whether the touch is made by recognizing a change in capacitance between the touch electrode TE and the pointer such as the finger or the pen. In the case of the touch sensing method based on the self-capacitance, there is no difference between the drive touch electrode and the sensing touch electrode.

The display apparatus according to the embodiment of the present disclosure may sense the touch by using a touch sensing method based on mutual-capacitance. Alternatively, the display apparatus may sense the touch by using a touch sensing method based on self-capacitance. Hereinafter, an example will be described in which the display apparatus performs the touch sensing based on mutual-capacitance and has the touch sensor structure to perform the touch sensing based on mutual-capacitance.

Figure 7:
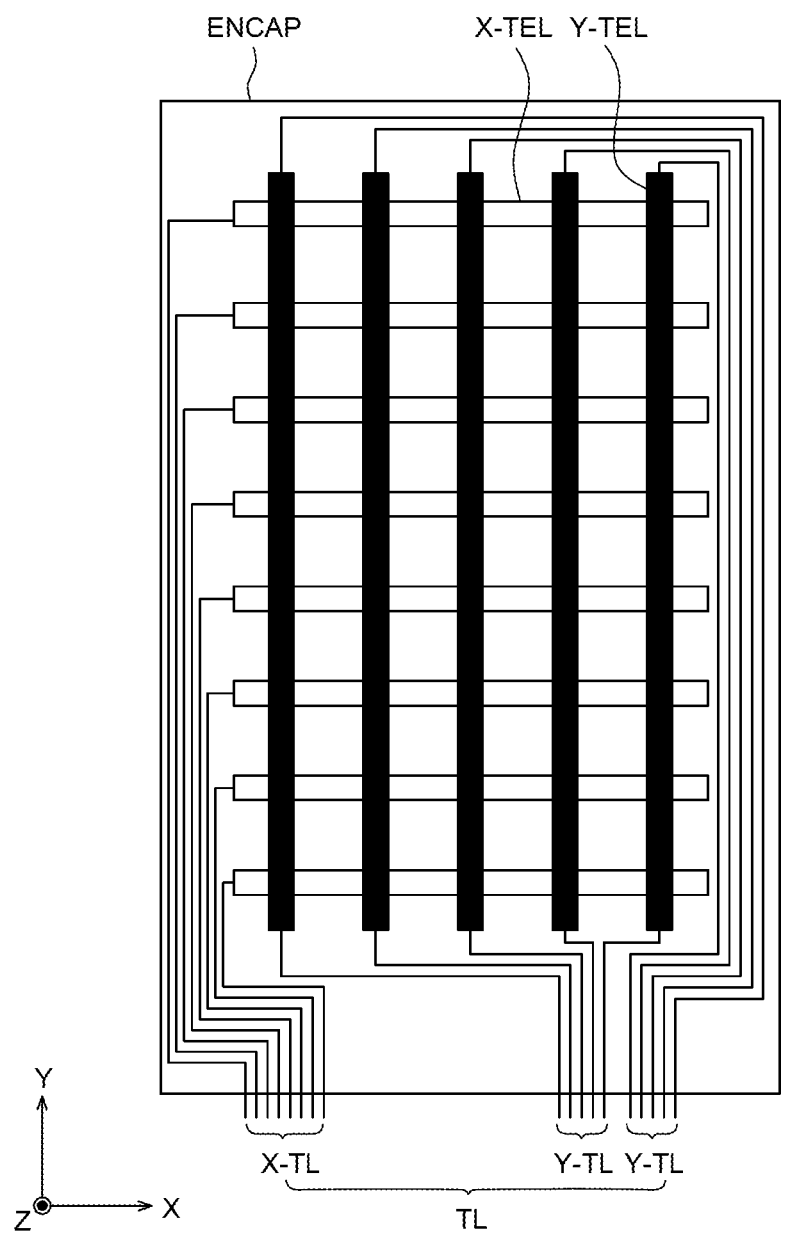
FIG. 7 illustrates a touch sensor structure of the touch panel according to an embodiment of the present disclosure.

FIG. 7 illustrates the touch sensor structure of the touch panel according to an embodiment of the present disclosure.

With reference to FIG. 7, the touch sensor structure for performing the touch sensing based on mutual-capacitance may include a plurality of X-touch electrode lines X-TEL and a plurality of Y-touch electrode lines Y-TEL. For example, the plurality of X-touch electrode lines X-TEL and the plurality of Y-touch electrode lines Y-TEL may be positioned on the encapsulation layer ENCAP.

The plurality of X-touch electrode lines X-TEL may be disposed in a first direction, and the plurality of Y-touch electrode lines Y-TEL may be disposed in a second direction different from the first direction.

In the present disclosure, the first direction and the second direction may be relatively different directions. For example, the first direction may be an x-axis direction, and the second direction may be a y-axis direction. On the contrary, the first direction may be the y-axis direction, and the second direction may be the x-axis direction. In addition, the first direction and the second direction may be orthogonal to each other but may not be orthogonal to each other. In addition, in the present disclosure, the row and column are relative factors, and the row and column may change to each other.

The plurality of X-touch electrode lines X-TEL may include several X-touch electrodes X-TE electrically connected. The plurality of Y-touch electrode lines Y-TEL may include several Y-touch electrodes Y-TE electrically connected. For example, the plurality of X-touch electrodes X-TE and the plurality of Y-touch electrodes Y-TE may be electrodes included in the plurality of touch electrodes TE and separated in functions.

For example, the plurality of X-touch electrodes X-TE constituting the plurality of X-touch electrode lines X-TEL may be the drive touch electrodes. The plurality of Y-touch electrodes Y-TE constituting the plurality of Y-touch electrode lines Y-TEL may be the sensing touch electrodes. For example, the plurality of X-touch electrode lines X-TEL may each be the drive touch electrode line. The plurality of Y-touch electrode lines Y-TEL may each be the sensing touch electrode line.

On the contrary, the plurality of X-touch electrodes X-TE constituting the plurality of X-touch electrode lines X-TEL may be the sensing touch electrodes. The plurality of Y-touch electrodes Y-TE constituting the plurality of Y-touch electrode lines Y-TEL may be the drive touch electrodes. For example, the plurality of X-touch electrode lines X-TEL may each be the sensing touch electrode line. The plurality of Y-touch electrode lines Y-TEL may each be the drive touch electrode line.

The touch sensor metal for the touch sensing may include a plurality of touch routing lines TL in addition to the plurality of X-touch electrode lines X-TEL and the plurality of Y-touch electrode lines Y-TEL.

The plurality of touch routing lines TL may include one or more X-touch routing lines X-TL respectively connected to the plurality of X-touch electrode lines X-TEL, and one or more Y-touch routing lines Y-TL respectively connected to the plurality of Y-touch electrode lines Y-TEL.

Figure 8:
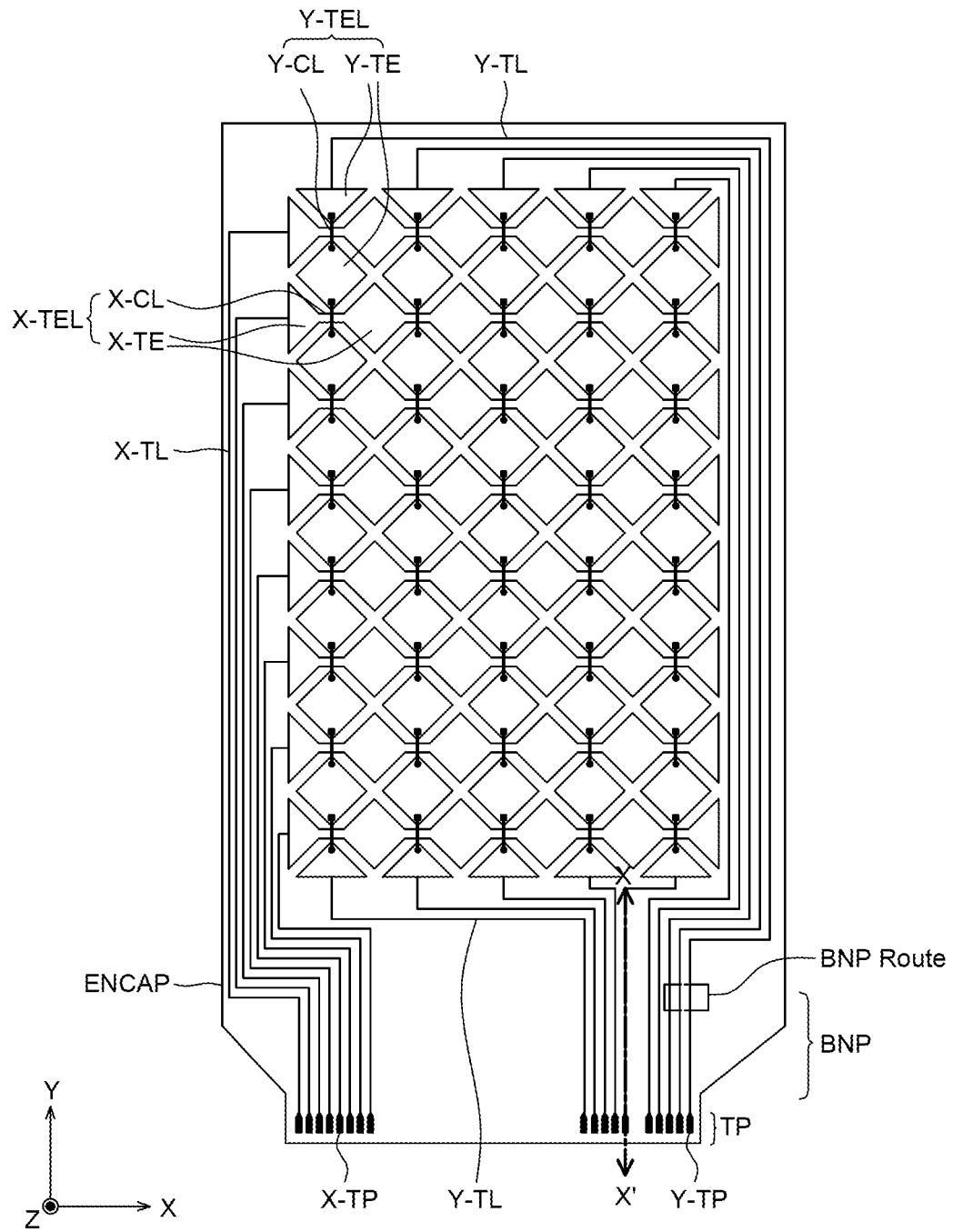
FIG. 8 illustrates a state in which the touch sensor structure in FIG. 7 is implemented.

FIG. 8 illustrates a state in which the touch sensor structure in FIG. 7 is implemented.

With reference to FIG. 8, the plurality of X-touch electrode lines X-TEL may include a plurality of X-touch electrodes (or second touch electrodes) X-TE disposed in the same row (or in the second direction), and one or more X-touch electrode connection lines (or second touch electrode connection lines) X-CL configured to electrically connect the plurality of X-touch electrodes. For example, the X-touch electrode connection line X-CL, which connects the two adjacent X-touch electrodes X-TE, may be a metal integrated with the two adjacent X-touch electrodes X-TE or a metal connected to the two adjacent X-touch electrodes X-TE through a contact hole.

The plurality of Y-touch electrode lines Y-TEL may include a plurality of Y-touch electrodes (or first touch electrodes) Y-TE disposed in the same column (or in the first direction), and one or more Y-touch electrode connection lines (or first touch electrode connection lines) Y-CL configured to electrically connect the plurality of Y-touch electrodes. For example, the Y-touch electrode connection line Y-CL, which connects the two adjacent Y-touch electrodes Y-TE, may be a metal integrated with the two adjacent Y-touch electrodes Y-TE or a metal connected to the two adjacent Y-touch electrodes Y-TE through a contact hole.

In the region in which the X-touch electrode line X-TEL and the Y-touch electrode line Y-TEL intersect each other (touch electrode line intersection region), the X-touch electrode connection line X-CL and the Y-touch electrode connection line Y-CL may intersect each other. When the X-touch electrode connection line X-CL and the Y-touch electrode connection line Y-CL intersect each other in the touch electrode line intersection region, the X-touch electrode connection line X-CL and the Y-touch electrode connection line Y-CL need to be positioned on different layers.

The plurality of X-touch electrodes X-TE, the plurality of X-touch electrode connection lines X-CL, the plurality of Y-touch electrodes Y-TE, the plurality of Y-touch electrode lines Y-TEL, the plurality of Y-touch electrode connection lines Y-CL may be positioned on two or more layers so that the plurality of X-touch electrode lines X-TEL and the plurality of Y-touch electrode lines Y-TEL are disposed to intersect one another.

With reference to FIG. 8, the plurality of X-touch electrode lines X-TEL are each electrically connected to the corresponding X-touch pad X-TP through the one or more X-touch routing lines X-TL. For example, the X-touch electrode X-TE, which is disposed at an outermost periphery among the plurality of X-touch electrodes X-TE included in one X-touch electrode line X-TEL, is electrically connected to the corresponding X-touch pad X-TP through the X-touch routing line X-TL.

The plurality of Y-touch electrode lines Y-TEL are each electrically connected to the corresponding Y-touch pad Y-TP through the one or more Y-touch routing lines Y-TL. For example, the Y-touch electrode Y-TE, which is disposed at an outermost periphery among the plurality of Y-touch electrodes Y-TE included in one Y-touch electrode line Y-TEL, is electrically connected to the corresponding Y-touch pad Y-TP through the Y-touch routing line Y-TL.

With reference to FIG. 8, the plurality of X-touch electrode lines X-TEL and the plurality of Y-touch electrode lines Y-TEL may be disposed on the encapsulation layer ENCAP. For example, the plurality of X-touch electrode connection lines X-CL and the plurality of X-touch electrodes X-TE constituting the plurality of X-touch electrode lines X-TEL may be disposed on the encapsulation layer ENCAP. The plurality of Y-touch electrode connection lines Y-CL and the plurality of Y-touch electrodes Y-TE constituting the plurality of Y-touch electrode lines Y-TEL may be disposed on the encapsulation layer ENCAP.

The plurality of X-touch routing lines X-TL electrically connected to the plurality of X-touch electrode lines X-TEL may be disposed on the encapsulation layer ENCAP and extend to a portion where no encapsulation layer ENCAP is provided. Further, the plurality of X-touch routing lines X-TL may be electrically connected to the plurality of X-touch pads X-TP. The plurality of Y-touch routing lines Y-TL electrically connected to the plurality of Y-touch electrode lines Y-TEL may be disposed on the encapsulation layer ENCAP and extend to the portion where no encapsulation layer ENCAP is provided. Further, the plurality of Y-touch routing lines Y-TL may be electrically connected to the plurality of Y-touch pads Y-TP. In this case, the encapsulation layer ENCAP may be positioned in the active area AA. In an embodiment, the encapsulation layer ENCAP may be expanded to the non-active area NA.

Figure 9:
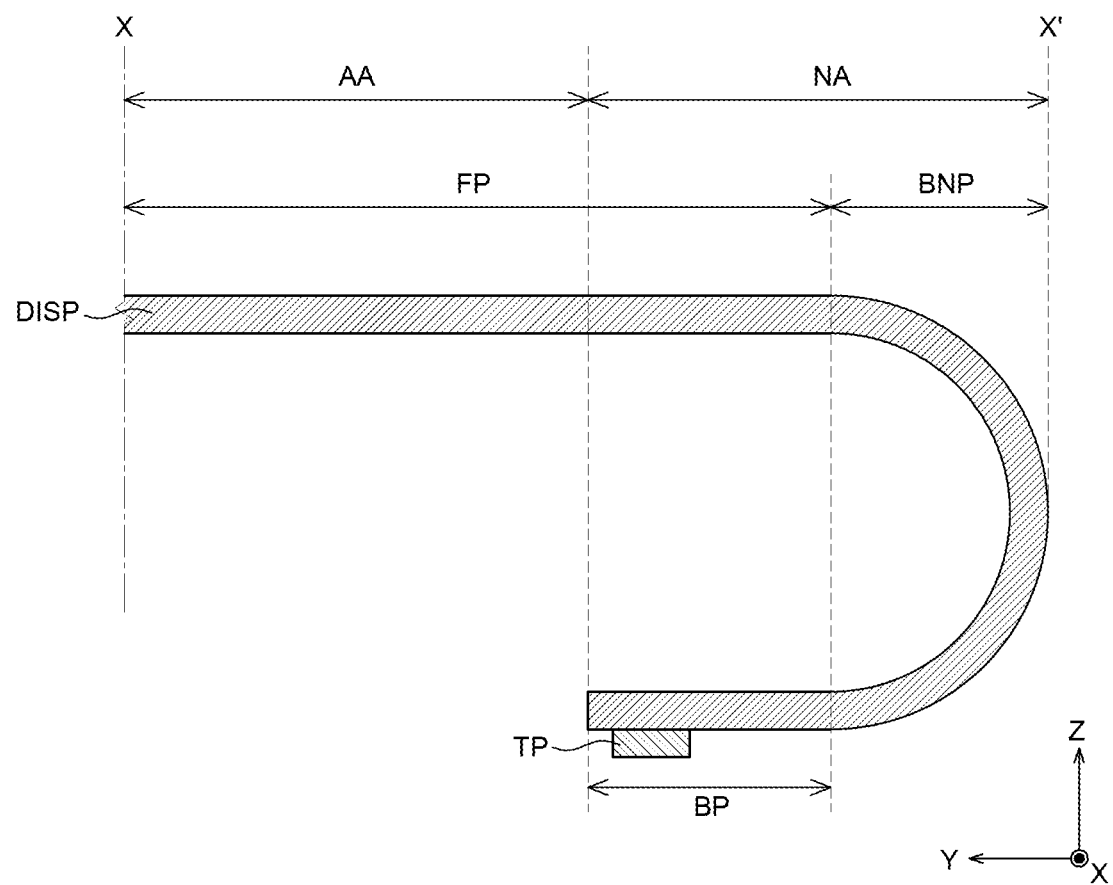
FIG. 9 is a cross-sectional view taken along cutting line X-X' in FIG. 8.
Figure 10:
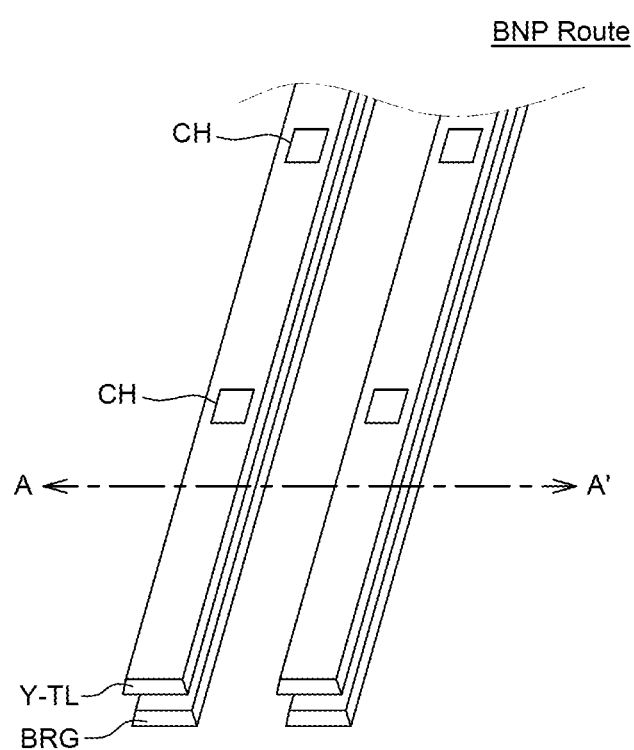
FIG. 10 is an enlarged perspective view of touch lines of a bending portion in FIG. 8.
Figure 11:
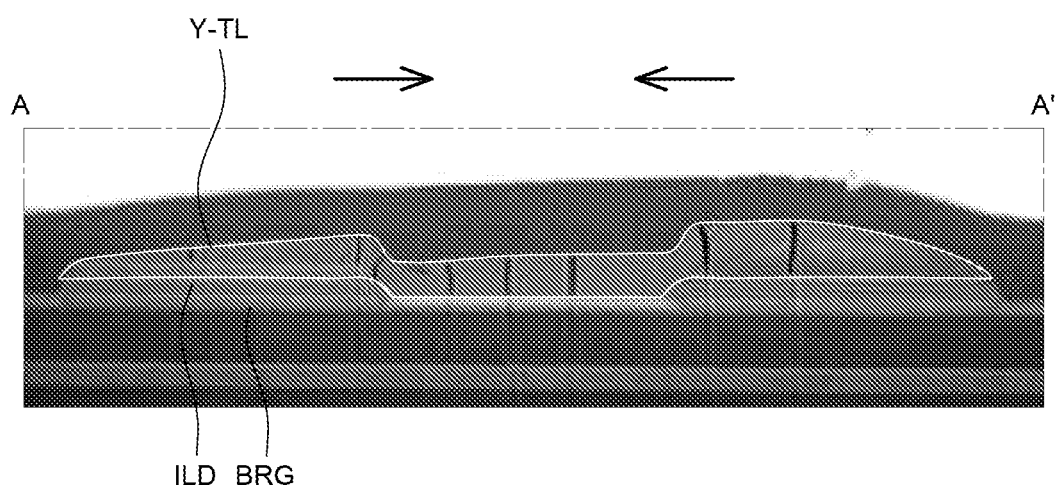
FIG. 11 is a photograph of a cross-section taken along cutting line A-A' in FIG. 10.

FIG. 9 is a cross-sectional view taken along cut surface X-X' in FIG. 8, FIG. 10 is an enlarged perspective view of touch lines of a bending portion in FIG. 8, and FIG. 11 is a photograph of a cross-section taken along cutting line A-A' in FIG. 10.

With reference to FIGS. 8 and 9, the display panel DISP according to an embodiment of the present disclosure may include a front portion FP having the display area (or the active area) AA and the non-display area (or the non-active area) NA, a bending portion BNP, and a back portion BP bent from the bending portion BNP and disposed rearward of the front portion FP. The plurality of touch routing lines TL electrically connected to the plurality of touch electrodes TE disposed in the display area AA may be disposed in the non-display area NA.

With reference to FIG. 10, a plurality of auxiliary lines BRG may be disposed below the plurality of touch routing lines TL. An insulating layer ILD may be disposed between the plurality of touch routing lines TL and the plurality of auxiliary lines BRG. The plurality of auxiliary lines BRG may be electrically connected to the plurality of touch routing lines TL through contact holes CH formed in the insulating layer ILD. The plurality of auxiliary lines BRG may be connected to the plurality of touch routing lines TL and increase line resistance, which provides an advantageous effect of implementing a stable operation by increasing the voltage that may be transmitted to the plurality of touch electrodes TE.

The second touch electrode connection line X-CL may be formed by the same process and made of the same material as the plurality of auxiliary lines BRG. The second touch electrode connection line X-CL may be a second bridge line or a touch connection line. However, the present disclosure is not limited to the term.

Because the bending portion BNP is bent to the back side of the substrate SUB after the display panel DISP and the various types of signal lines including the plurality of touch routing lines TL are formed on the flat substrate SUB, the plurality of touch routing lines TL disposed on the bending portion BNP may be exposed to the bending stress. The bending stress may be tensile stress, which is applied to an outer portion of the bending structure while the outer portion of the bending structure is stretched. Further, the bending stress may be pressure stress applied by a restoring force of an upper (or top surface) structure. However, the present disclosure is not limited thereto. For example, the upper structures formed on the top surfaces of the plurality of touch routing lines TL may be bent together with the plurality of touch routing lines TL. A restoring force applied by the upper structure to resist against the bending may be transmitted, as a compressive force, to the plurality of touch routing lines TL. The upper structure may be a first structure, a protective film, or an insulating layer. However, the present disclosure is not limited to the terms and the number of upper structures.

The upper structures of the plurality of touch routing lines TL disposed on the bending portion BNP may also be exposed to the bending stress. The crack may occur on the upper structure because of the tensile stress applied to the upper structure. An outside chemical material may penetrate into a crack formed in the upper structure and move to the plurality of touch routing lines TL. Further, a chemical material in the upper structure may leak through a crack formed in the upper structure and move to the plurality of touch routing lines TL. However, the present disclosure is not limited thereto. For example, the chemical material may be iodine (I) or chlorine (Cl). However, the present disclosure is not limited thereto.

The plurality of touch routing lines TL may be multilayer metal lines. For example, the touch routing line may be a line in which titanium (Ti), aluminum (Al), and titanium (Ti) are stacked. However, the present disclosure is not limited thereto.

The chemical material transmitted to the plurality of touch routing lines TL may generate a chemical reaction and affect the shapes or functions of the plurality of touch routing lines TL. For example, the chemical material such as iodine (I) or chlorine (Cl) may chemically react with the multilayer metal line that constitutes the plurality of touch routing lines TL. With reference to FIG. 11, the transmitted chemical material may chemically react with an aluminum (Al) line among the multilayer metal lines constituting the plurality of touch routing lines TL, and the adjacent aluminum (Al) lines are expanded and adjoin one another, which may cause electrical connection (or short circuits).

The aluminum (Al) lines may be expanded in several directions. The plurality of touch routing lines TL receives compressive stress from the upper structure. Therefore, the expansion of the aluminum (Al) line in a stacking direction (or vertical direction) may be restricted. For example, a direction, in which the aluminum (Al) line is expanded, may be a direction (or a horizontal direction) toward the adjacent lines, as indicated by the arrows in FIG. 11. The electrical connection may occur as the expanded lines come into contact with one another.

Figure 12:
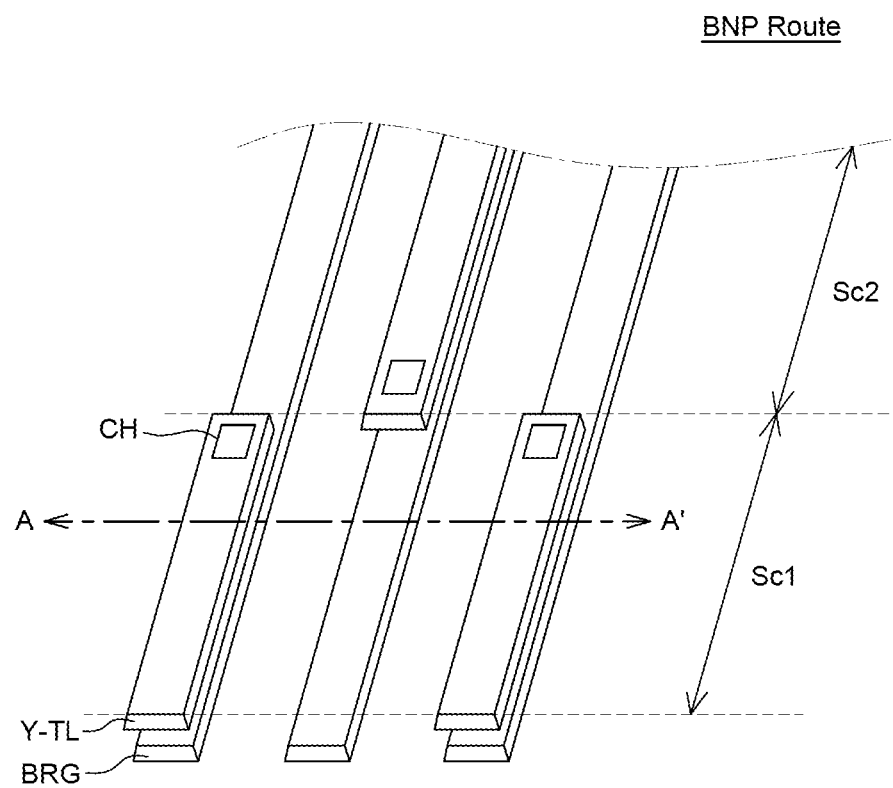
FIG. 12 is an enlarged perspective view of the touch lines of the bending portion in FIG. 8.
Figure 13:
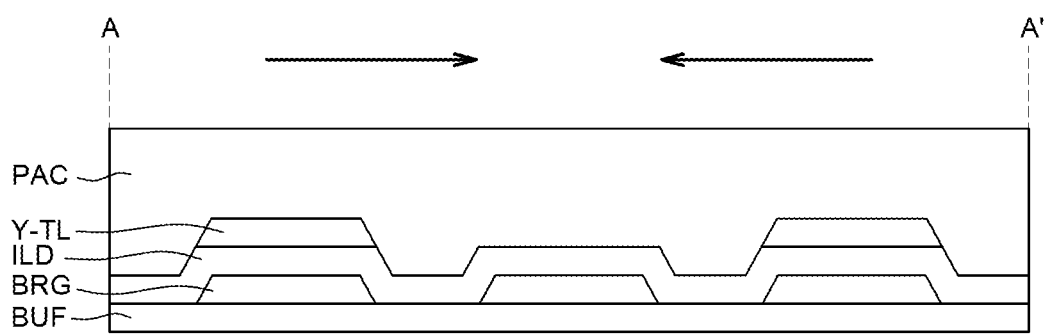
FIG. 13 is a cross-sectional view taken along cutting line A-A' in FIG. 12.

FIG. 12 is an enlarged perspective view of the touch line of the bending portion in FIG. 8, and FIG. 13 is a cross-sectional view taken along cutting line A-A' in FIG. 12.

With reference to FIGS. 8, 12, and 13, in the display apparatus according to an embodiment of the present disclosure, the plurality of touch routing lines TL disposed on the bending portion BNP of the display panel DISP may be discontinuously disposed while having a predetermined length. For example, the plurality of touch routing lines TL each having a predetermined length may be alternately disposed for each predetermined section. The insulating layer ILD may be disposed between the plurality of auxiliary lines BRG and the plurality of touch routing lines TL each having a predetermined length. The plurality of auxiliary lines BRG and the plurality of touch routing lines TL each having a predetermined length may be electrically coupled to one another through the contact holes CH.

As described above, the plurality of touch routing lines TL may be electrically connected to a touch pad TP disposed on the back portion BP of the display panel DISP. The plurality of touch routing lines TL may be electrically connected to the touch electrode TE disposed on the front portion FP. For example, the plurality of touch routing lines TL may be disposed over the front portion FP, the bending portion BNP, and the back portion BP of the display panel DISP.

The bending portion BNP is bent from the back surface of the substrate SUB after the various types of signal lines including the display panel DISP and the plurality of touch routing lines TL are formed on the substrate SUB having a planar shape on the same plane. Therefore, the plurality of touch routing lines TL disposed on the bending portion BNP may be exposed to the bending stress.

The bending stress may be tensile stress, which is applied to an outer portion of the bending structure while the outer portion of the bending structure is stretched. Further, the bending stress may be pressure stress applied by a restoring force of an upper (or top surface) structure. However, the present disclosure is not limited thereto. For example, the lower structures formed on the bottom surfaces of the plurality of touch routing lines TL may be bent together with the plurality of touch routing lines TL. The plurality of touch routing lines TL may receive a tensile force. For example, the upper structures formed on the top surfaces of the plurality of touch routing lines TL may be bent together with the plurality of touch routing lines TL. A restoring force applied by the upper structure to resist against the bending may be transmitted, as pressure, to the plurality of touch routing lines TL. The upper or lower structures may be protective films PAC, buffer layers BUF, or insulating films. However, the present disclosure is not limited to the terms, the functions, and the number of upper or lower structures.

The upper structures of the plurality of touch routing lines TL disposed on the bending portion BNP may also be exposed to the bending stress. The crack may occur on the upper structure because of the tensile stress applied to the upper structure. An outside chemical material may penetrate into a crack formed in the upper structure and move to the plurality of touch routing lines TL. Further, a chemical material in the upper structure may leak through a crack formed in the upper structure and move to the plurality of touch routing lines TL. However, the present disclosure is not limited thereto. For example, the chemical material may be iodine (I) or chlorine (Cl). However, the present disclosure is not limited thereto.

The plurality of touch routing lines TL may be multilayer metal lines. For example, the touch routing line may be a line in which titanium (Ti), aluminum (Al), and titanium (Ti) are stacked. However, the present disclosure is not limited thereto.

The chemical material transmitted to the plurality of touch routing lines TL may generate a chemical reaction and affect the shapes or functions of the plurality of touch routing lines TL. For example, the chemical material such as iodine (I) or chlorine (Cl) may chemically react with the multilayer metal line that constitutes the plurality of touch routing lines TL. The transmitted chemical material may chemically react with an aluminum (Al) line among the multilayer metal lines constituting the plurality of touch routing lines TL, and the adjacent aluminum (Al) lines are expanded and come into contact with one another, which may cause electrical connection (or short circuits).

The aluminum (Al) lines may be expanded in several directions. The plurality of touch routing lines TL receives compressive stress from the upper structure. Therefore, the expansion of the aluminum (Al) line in a stacking direction (or vertical direction) may be restricted. For example, a direction, in which the aluminum (Al) line is expanded, may be a direction (or a horizontal direction) toward the adjacent lines. The electrical connection may occur as the expanded lines come into contact with one another.

The plurality of touch routing lines TL disposed on the bending portion BNP of the display panel DISP may each have a predetermined length and may be discontinuously disposed, for example, disposed alternately for each predetermined section. With reference to FIG. 12, in a first section Sc1 of the bending portion BNP, only the even-numbered touch routing lines may be disposed, but the odd-numbered touch routing lines may not be disposed. In the second section Sc2 of the bending portion BNP, only the odd-numbered touch routing lines may be disposed, and the even-numbered touch routing lines may not be disposed. Therefore, the electrode resistance value of the touch routing line TL may be maintained without being greatly decreased, and the influence of the expansion of the lines caused by the physical/chemical deformation may be reduced. With reference to FIG. 13, for example, the plurality of touch routing lines TL are alternately disposed for each predetermined section of the bending portion BNP. Therefore, a distance between the adjacent touch routing lines TL may increase by at least two times a distance between the routing lines TL disposed on the bending portion BNP without section setting. However, the present disclosure is not limited thereto. The contact between the adjacent lines caused by the expansion of the adjacent lines may be suppressed or reduced. For example, because the plurality of touch routing lines TL is alternately disposed for each predetermined section of the bending portion BNP, an average height (or thickness) of the plurality of touch routing lines TL may decrease, which may reduce bending stress applied to the plurality of touch routing lines TL.

The section of the bending portion BNP may be equally divided into n sections (n is a natural number of two or more) in a direction perpendicular to the bending direction of the bending portion BNP. However, the present disclosure is not limited thereto. For example, the respective sections of the bending portion BNP are made by equally dividing the bending portion BNP into n sections in the second direction (or the X-axis direction). The bending portion BNP may not be equally divided, and the number of sections and the lengths of the sections may be set in various ways.

The plurality of touch routing lines TL may be alternately disposed in any one section among the sections Sc1 to Scn of the bending portion BNP. However, the present disclosure is not limited thereto. For example, the lines in the three columns in any one section may be set into one group, and the first touch routing lines may be disposed in the group. The arrangement of the second and third touch routing lines may be omitted. However, the present disclosure is not limited to the above-mentioned method.

The numbers of pluralities of touch routing lines TL disposed in each of the sections of the bending portion BNP are combined. Therefore, it is possible to reduce or block the influence of bending stress and penetration of chemical materials that may be applied to the plurality of touch routing lines TL on the bending portion BNP of the display panel DISP. Accordingly, it is possible to provide the display apparatus that has a narrow bezel with reliability and is resistant to physical/chemical deformation.

A display apparatus according to an embodiment of the present disclosure will be described as follows.

A display apparatus according to an embodiment of the present disclosure comprises a display panel comprising a front portion including a display area and a non-display area, a bending portion, and a back portion bent from the bending portion and disposed rearward of the front portion, a plurality of touch routing lines disposed in the non-display area and electrically connected to a plurality of touch electrodes disposed in the display area, and a plurality of auxiliary lines disposed below the plurality of touch routing lines. The plurality of touch routing lines are discontinuously disposed on the bending portion while having a predetermined length.

According to some embodiments of the present disclosure, the predetermined length may be a length in a bending direction of each of n (n is a natural number of two or more) sections when the bending portion is equally divided into the n sections in a direction perpendicular to the bending direction.

According to some embodiments of the present disclosure, the plurality of touch routing lines disposed on the bending portion may be alternately disposed on the plurality of auxiliary lines adjacent to one another in each of the n sections.

According to some embodiments of the present disclosure, the display apparatus may further comprise an insulating layer disposed between the plurality of auxiliary lines and the plurality of touch routing lines.

According to some embodiments of the present disclosure, a contact hole may be formed in the insulating layer, and the plurality of touch routing lines may be connected to the plurality of auxiliary lines through the contact hole.

According to some embodiments of the present disclosure, the display apparatus may further comprise an encapsulation layer disposed between the display panel and the plurality of touch electrodes.

According to an embodiment of the present disclosure, a display apparatus comprises a display panel comprising a front portion including a display area and a non-display area, a bending portion, and a back portion bent from the bending portion and disposed rearward of the front portion, a plurality of light-emitting elements disposed in the display area, a plurality of signal lines disposed in the non-display area positioned outside the display area, an encapsulation layer disposed on the light-emitting element and the signal line, a plurality of first touch electrodes disposed on the encapsulation layer in the display area and arranged in a first direction, a plurality of second touch electrodes disposed on the encapsulation layer in the display area and arranged in a second direction perpendicular to the first direction, a first touch electrode connection line connecting the plurality of first touch electrodes to each other, a second touch electrode connection line disposed between the plurality of first touch electrodes and connecting the plurality of second touch electrodes to each other, a plurality of touch routing lines disposed on the encapsulation layer in the non-display area and electrically connected to the plurality of first touch electrodes or the plurality of second touch electrodes, and a plurality of auxiliary lines disposed below the plurality of touch routing lines. The second touch electrode connection line and the plurality of auxiliary lines are formed by the same process and made of the same material.

According to some embodiments of the present disclosure, the plurality of touch routing lines disposed on the bending portion may be discontinuously disposed for each predetermined section.

According to some embodiments of the present disclosure, the predetermined section may be one of n (n is a natural number of two or more) sections made by equally dividing the bending portion in the second direction.

According to some embodiments of the present disclosure, the plurality of touch routing lines may be alternately disposed on the plurality of auxiliary lines adjacent to one another in each of the n sections.

According to some embodiments of the present disclosure, the display apparatus may further comprise an insulating layer disposed between the plurality of touch routing lines and the plurality of auxiliary lines.

It will be apparent to those skilled in the art that various modifications and variations can be made in the present disclosure without departing from the technical idea or scope of the disclosures. Thus, it is intended that the present disclosure covers the modifications and variations of this disclosure and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus comprising:
   a display panel comprising a front portion including a display area and a non-display area, a back portion opposite to the front portion, and a bending portion that bends between the front portion and the back portion;

a plurality of touch routing lines disposed in the non-display area and electrically connected to a plurality of touch electrodes disposed in the display area; and a plurality of auxiliary lines disposed below the plurality of touch routing lines, wherein the plurality of touch routing lines are discontinuously disposed on the bending portion while each have a predetermined length, the bending portion includes n equal sections in a direction that crosses a bending direction of the bending portion, and wherein the predetermined length is a length in the bending direction of each of the n sections, n being a natural number equal to or greater than two, and the plurality of touch routing lines disposed on the bending portion are alternately disposed on the plurality of auxiliary lines adjacent to one another in each of the n sections, respectively.

2. The display apparatus of claim 1, further comprising:
an insulating layer disposed between the plurality of auxiliary lines and the plurality of touch routing lines.

3. The display apparatus of claim 2, wherein the insulating layer includes a contact hole, and the plurality of touch routing lines are connected to the plurality of auxiliary lines through the contact hole.

4. The display apparatus of claim 1, further comprising:
an encapsulation layer disposed between the display panel and the plurality of touch electrodes.

5. A display apparatus comprising:
a display panel comprising a front portion including a display area and a non-display area, a back portion opposite to the front portion and a bending portion that bends between the front portion and the back portion;
a plurality of light-emitting elements disposed in the display area;
a plurality of signal lines disposed in the non-display area and positioned outside the display area;
an encapsulation layer disposed on the light-emitting elements and the signal lines;
a plurality of first touch electrodes disposed on the encapsulation layer in the display area and arranged in a first direction;
a plurality of second touch electrodes disposed on the encapsulation layer in the display area and arranged in a second direction that crosses the first direction;
a first touch electrode connection line connecting the plurality of first touch electrodes to each other;
a second touch electrode connection line disposed between the plurality of first touch electrodes and connecting the plurality of second touch electrodes to each other;
a plurality of touch routing lines disposed on the encapsulation layer in the non-display area and electrically connected to the plurality of first touch electrodes or the plurality of second touch electrodes; and
a plurality of auxiliary lines disposed below the plurality of touch routing lines, wherein the plurality of touch routing lines are disposed on the bending portion and are discontinuously disposed in each of predetermined sections of the bending portion, respectively,
wherein the second touch electrode connection line and the plurality of auxiliary lines are formed by a same process and of a same material,
the predetermined sections include n equal sections of the bending portion in the second direction, n being a natural number equal to or greater than two, and
the plurality of touch routing lines is alternately disposed on the plurality of auxiliary lines adjacent to one another in each of the n sections, respectively.

6. The display apparatus of claim 5, further comprising:
an insulating layer disposed between the plurality of touch routing lines and the plurality of auxiliary lines.

7. The display apparatus of claim 6, wherein the insulating layer includes a contact hole, and the plurality of touch routing lines are connected to the plurality of auxiliary lines through the contact hole.

* * * * *